S. HUGHES.

Improvement in Self-Heating Pocket-Flasks.

No. 114,143.  
Patented April 25, 1871.

United States Patent Office.

SEYMOUR HUGHES, OF HUDSON, NEW YORK.

Letters Patent No. 114,143, dated April 25, 1871.

IMPROVEMENT IN SELF-HEATING POCKET-FLASKS.

The Schedule referred to in these Letters Patent and making part of the same.

*To all whom it may concern:*

Be it known that I, SEYMOUR HUGHES, of Hudson, in the county of Hudson and State of New Jersey, have invented a new and improved Self-Heating Pocket-Flask; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
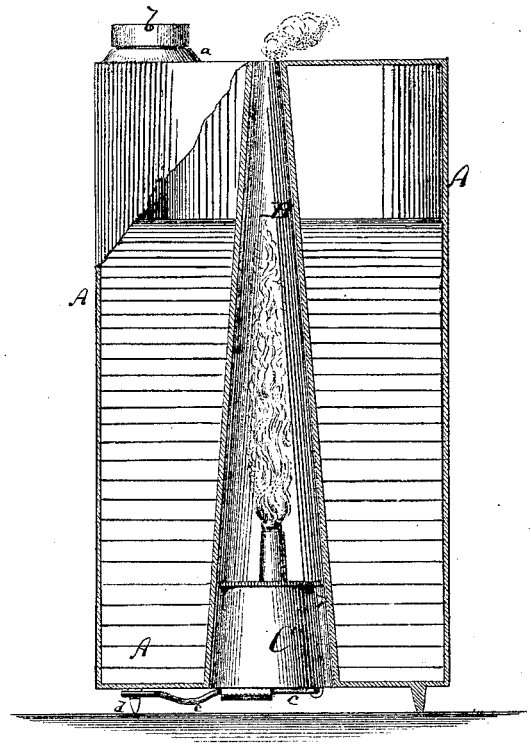
Figure 1 represents a vertical central section, partly side view, of my improved pocket-flask, the plane of section being indicated by the line x x, fig. 2.
Figure 2:
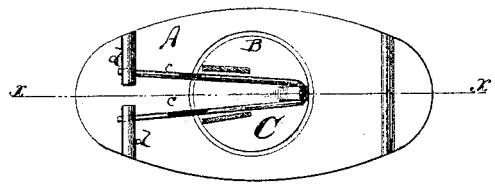
Figure 2 is an inverted plan view of the same.

This invention relates to a new portable flask for mechanics, laborers, &c., which is provided with a heating attachment, whereby its contents can be warmed whenever desired.

Workingmen are thereby enabled to heat their coffee or other beverage at dinner time, and enjoy a warm meal, where heretofore they had to do without it.

A in the drawing represents a pocket-flask, of suitable shape and size, provided with a nozzle, a, and cap b thereto, as usual.

Through the flask is fitted, from bottom to top, as in fig. 1, or from bottom to one or both sides, a tube, B, which is largest at the lower end.

A small lamp, C, containing alcohol or other liquid, is secured within the lower end of said tube by means of springs c c, which are fastened to the bottom of the lamp and catch over lugs or ears d, projecting from the bottom of the flask, or *vice versa*.

Whenever the lamp C is lighted in its place within the tube it will heat the sides of the latter, and thereby warm the liquid contents of the flask. The lamp can be quite small, to contain just enough for heating the contents of the flask once.

It is entirely concealed within the flask, and does thereby not interfere with the convenient shape of the same, while materially increasing its value.

Having thus described my invention,

I claim as new and desire to secure by Letters Patent—

The portable flask, provided with the concealed lamp C and heating-tube B, substantially as herein shown and described.

SEYMOUR HUGHES.

Witnesses:
    GEO. W. MABEE,
    T. B. MOSHER.